(12) United States Patent
Karbe

(10) Patent No.: US 7,102,834 B2
(45) Date of Patent: Sep. 5, 2006

(54) PHOTOGRAPHIC OBJECTIVE OF THE MODIFIED DOUBLE GAUSS TYPE

(75) Inventor: Peter Karbe, Leun (DE)

(73) Assignee: Leica Camera AG, Solms (DE)

( * ) Notice: Subject to any disclaimer, the term of this patent is extended or adjusted under 35 U.S.C. 154(b) by 0 days.

(21) Appl. No.: 11/059,453

(22) Filed: Feb. 16, 2005

(65) Prior Publication Data
US 2005/0185301 A1    Aug. 25, 2005

(30) Foreign Application Priority Data
Feb. 22, 2004   (DE) ...................... 10 2004 008 997

(51) Int. Cl.
*G02B 9/62*     (2006.01)
*G02B 13/18*    (2006.01)
*G02B 3/02*     (2006.01)

(52) U.S. Cl. ...................................... 359/760; 359/708
(58) Field of Classification Search ........ 359/759–760, 359/755, 756, 763–765, 708, 713
See application file for complete search history.

(56) References Cited

U.S. PATENT DOCUMENTS 2,846,923 A * 8/1958 Albrecht ..................... 359/754
3,357,774 A * 12/1967 Becker ....................... 359/765
3,738,735 A    6/1973 Schlegel
5,159,496 A * 10/1992 Kataoka ..................... 359/754
5,161,060 A    11/1992 Watz
5,835,286 A * 11/1998 Yamanashi .................. 359/755
5,886,835 A *  3/1999 Suzuki et al. ............... 359/782
6,519,097 B1   2/2003 Ohno

FOREIGN PATENT DOCUMENTS

DE    22 22 892 C3   11/1973
DE    40 05 300 C2    8/1991

* cited by examiner

Primary Examiner—Alicia M Harrington
(74) Attorney, Agent, or Firm—Foley & Lardner LLP

(57) ABSTRACT

A photographic objective of the modified double gauss type is presented. The object has a forward group that includes three lens elements (L1, L2, L3) and has the refractive power sequence ++−. The objective also includes an aperture and a rear group including lens elements (L4, L5, L6) of refractive power sequence −++. The lens element of negative refractive power (L4) is designed as a meniscus with an aspheric surface concave relative to the aperture, and a lens element of negative refractive power (L7) with surfaces concave on both sides is arranged downstream of the last lens element of positive refractive power (L6).

12 Claims, 2 Drawing Sheets

PHOTOGRAPHIC OBJECTIVE OF THE MODIFIED DOUBLE GAUSS TYPE

BACKGROUND OF THE INVENTION

The invention relates to a photographic objective of the modified double gauss type comprising three lens elements (L1, L2, L3) and having the refractive power sequence positive, positive, negative, an aperture and a rear group including lens elements (L4, L5, L6) of refractive power sequence negative, positive, positive, wherein in the rear group the lens element of negative refractive power (L4) is designed as a meniscus with an aspheric surface concave relative to the aperture, and a lens element of negative refractive power (L7) with surfaces concave on both sides is arranged downstream of the last lens element of positive refractive power (L6).

Photographic objectives of the double gauss type are distinguished by an arrangement, symmetrical relative to the aperture, of lens elements with the refractive power sequence ++−/−++ or −++/++−. U.S. Pat. No. 6,519,097 B2 discloses such an objective with the refractive power sequence ++−/−++ in which all the lens elements are designed as individual lenses. The relative aperture of the objective is 1:2.9.

DE 22 22 892 C3 discloses an identical objective in which the two lens elements adjacent to the aperture are designed in each case as a cemented meniscus which is hollow toward the aperture. The objective has a relative aperture of 1:2 and exhibits a compact overall lens.

DE 40 05 300 C2 discloses a wide-angle objective of the modified double gauss type with the focal length f=35 mm, which exhibits a compact overall length, a good imaging quality and a high aperture of 1:1.4. The first lens is designed as a cemented component that is concave on the object side and has a positive refractive power overall. The two downstream lenses of positive and negative refractive power are likewise designed as cemented components, the surface that is convex on the object side being designed aspherically. A lens of negative and positive refractive power is embodied on the image side as a cemented component, a meniscus of positive refractive power that is concave on the object side being placed upstream of this cemented component. The further image-side lens of positive refractive power is cemented with a lens of negative refractive power, the object-side convex surface of this lens element being of aspheric design.

The concave front surface of the objective leads firstly to a widening of the incoming imaging beam which must be counteracted by appropriately strong refractive powers of the downstream lenses toward the aperture.

The two aspheric surfaces are relatively expensive to manufacture. Moreover, these surfaces are very susceptible to tilt errors and centering errors and therefore lead to an increased outlay on assembly during the manufacture of the cemented components and insertion into the objective system. The design of the first lens element as a cemented component raises the number of the lenses to be fabricated, and thereby likewise leads to a rise in cost.

BRIEF SUMMARY OF THE INVENTION

The invention was therefore based on the object of providing a photographic objective with a focal length f of between 40 mm and 80 mm, an overall length shortened by reducing the number of lenses, a high aperture of better than 1:2.8, and an improved imaging performance in the short-range field up to a object distance of approximately 0.70 m. This object is achieved by a photographic objective of the type mentioned at the beginning. Advantageous refinements follow from the features described herein.

It is to be noted in relation to the solution features specified in the claims that in the context of modern optical design it is customary to make use of automatic correction programs such as, for example, "code V" of the Optical Research Association, which are capable of calculating from prescribed lens sequences and refractive power distributions proposals for functional objective systems with a correction state that is optimized for a specific task. The automatically attained correction state is further improved in each case on the basis of targeted variations in individual parameters by the optical designer.

It is already possible in this way to use the features of claim 1 in obtaining the design data for radii, lens thicknesses, lens distances, refractive indices and Abbe numbers of the optical lenses to be used. The design parameters can be improved step by step in a targeted way taking account of the features specified in the subclaims.

Exemplary embodiments of the objective according to the invention are illustrated schematically in the drawing, in which:

DETAILED DESCRIPTION OF THE PREFERRED EMBODIMENTS

Figure 1:
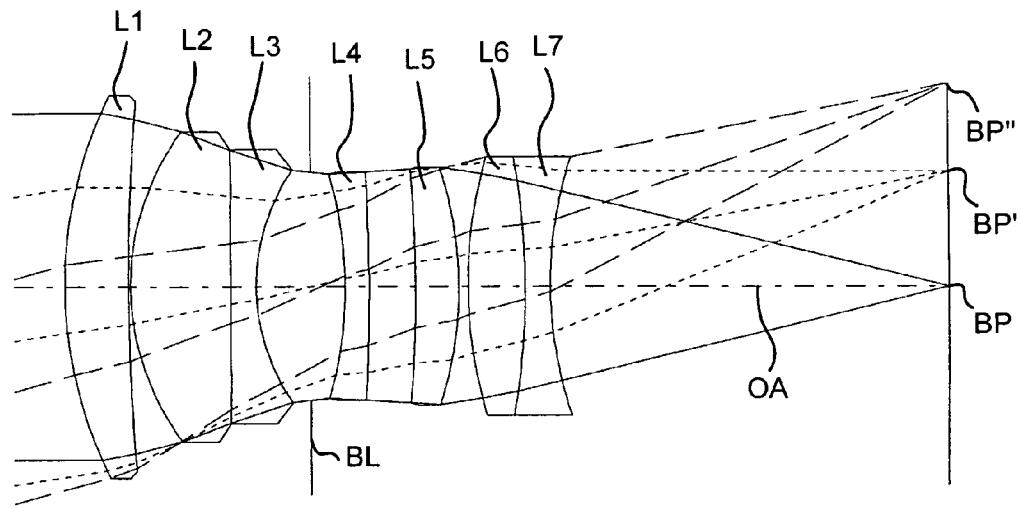
FIG. 1 shows the lens section through an objective with f=75 mm and an aperture of 1:2.0 in the infinity setting.

In the case of the objective according to FIG. 1, the front lens is designed as a convex-concave lens element (L1) made from a glass in the mid range of refractive index. The form of the lens element permits a relatively large diameter that is suitable for a high aperture of the objective and, therefore, for the capture of a widely opened input beam. The partial focal length f (L1) of the front lens (L1) of 77 mm for example, already enables a good constriction of the imaging beam toward the aperture space, whose free diameter is limited in general because of mechanical stipulations.

The disadvantage of lenses in the mid to higher range of refractive index consists in that they have a low Abbe number and therefore cause a relatively high color dispersion. For this reason, lenses with an anomalous partial dispersion are used for the purpose of correcting the color distortion in the two downstream lens elements (L2/L3). In the case of a design as cemented component, the latter has a negative refractive power overall. The partial focal length f (L2/L3) is −94 mm, for example.

In the case of a design as two individual lenses (L2, L3), additional degrees of freedom for correction by varying radii and distance are provided in the front group. The design as cemented element (L2/L3) by contrast reduces the sensitivity to tolerance with reference to distance, thickness and centering errors in conjunction with fabrication and mounting. It is known that distance and thickness errors produce errors lying symmetrically in the image field, and that centering errors produce asymmetrical image errors. The methods for fabricating cemented components exclude at least centering errors between the cemented lenses.

The design of the negative meniscus (L4) following the aperture (BL) and having a concave aspheric light input surface serves primarily for correcting this spherical error as far as the edge region of the image field. The variation in the aspheric surface curvature is determined by conventional formulas for the sagitta as a function of the chord. With modern fabrication methods, the fabrication of a concave aspheric surface is essentially no more difficult that that of a convex aspheric surface. The advantage of the present design consists in that the meniscus is designed as individual lens (L4) in the case of which the centering and axial alignment with the further spherical surface is substantially less problematical than in the case of a cemented component. The partial focal length f (L4) of this lens element (L4) is −76 mm, for example.

The first lens element of positive refractive power (L5) in the rear element is designed as an individual lens with a partial focal length f (L5) of 65 mm, for example. The type of lens used is in the high range of refractive index, just as in the case of the downstream lens element of positive refractive power (L6).

The combination of the two last lens elements (L6, L7) of the rear group to form a cemented component (L6/L7) serves the purpose of the reduction already mentioned in the sensitivity of the system to tolerance, in particular with reference to asymmetric image errors. The partial focal length f (L6/L7) of the cemented component (L6/L7) is 141 mm, for example.

In addition, the air gap between this cemented component (L6/L7) and the lens element (L5) upstream thereof is particularly important.

Focusing the objective to shorter object distances generally produces image errors resulting, for example, from the variation in spherical aberration. It becomes evermore difficult with increasing focal length of the objective to balance these image errors produced in the short-range field. In the case of the objective according to the invention, the spherical imaging error can advantageously be corrected solely by varying the air gap between the cemented component (L6/L7) and the lens element (L5) arranged upstream thereof in the direction of the light. It is advantageous in this case when the two outer surfaces of the last cemented component (L6/L7) lie approximately concentrically relative to an image point (BP) lying on the optical axis (OA) of the objective. The beam producing the image point (BP) and illustrated in FIG. 1 passes through the cemented component (L6/L7) virtually without refraction.

Figure 1A:
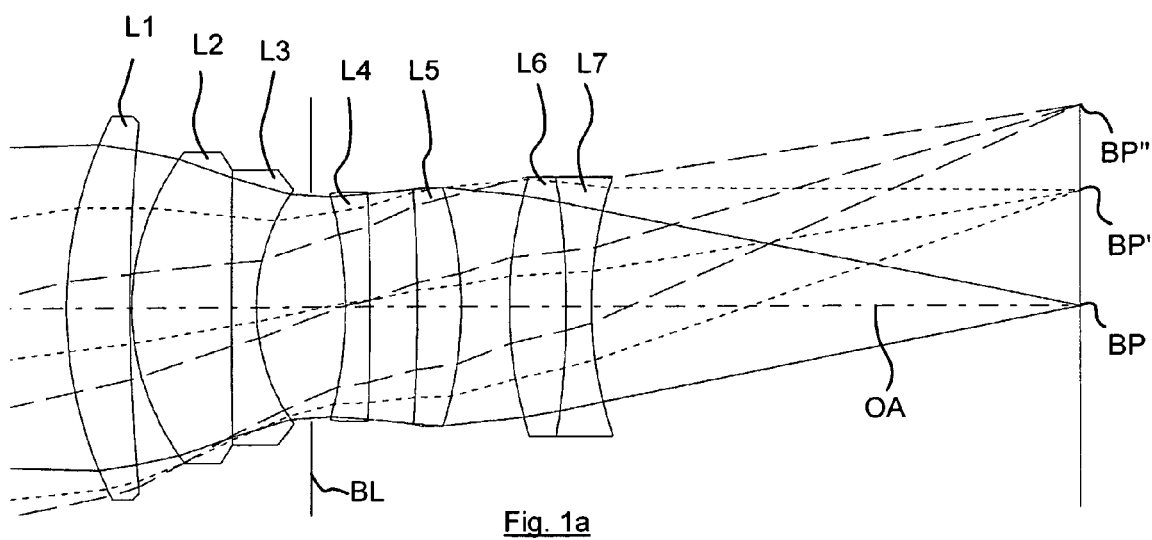
FIG. 1a shows the same lens section in the close-up focusing of 0.70 m.

In order to vary the air gap in the case of the close-up focusing, the last cemented component (L6/L7) can be arranged on a special part of the mount that can be displaced relative to the mount of the remaining lens elements. FIG. 1 shows the objective in a position focused at infinity. If focusing is carried out for more closely situated objects, the entire objective head moves away from the imaging plane, the last cemented component (L6/L7) executing this movement more slowly, and the air gap relating to the preceding lens element (L5) therefore being enlarged (FIG. 1a).

The air gap between the two lens elements named can moreover be used as setting distance. A setting distance serves the purpose, for example, of compensating the fluctuation in the spherical error caused by manufacturing tolerances. In the case of the present objective, given this distance it is possible at the end of the mounting operation to compensate the symmetrical manufacturing tolerances in the radii, thicknesses and distances of the lens elements already inserted into the mount.

The image-side concave radius on the last cemented component (L6/L7) is particularly suitable, in addition to the above mentioned concentric arrangement of the outer surfaces, for correcting imaging errors for image points (BP', BP'') lying outside in the image field.

Figure 2:
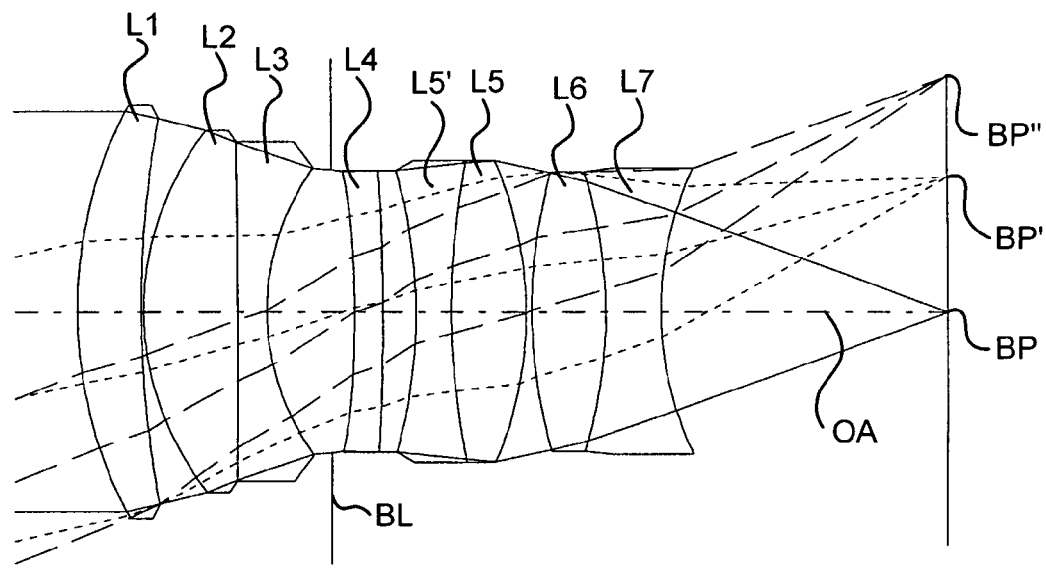
FIG. 2 shows the lens section through an objective with f=50 mm and an aperture of 1:1.4.

The front part of the objective illustrated in section in FIG. 2 is of identical construction to the objective illustrated in FIG. 1. A high-index glass has merely been inserted into the front lens (L1). However, at f (L1)=77 mm and f (L2/L3)=−97 mm, the partial focal lengths are virtually identical to the objective according to FIG. 1.

In this exemplary embodiment, the lens element (L4) which follows the aperture (BL) and has an aspheric light input surface has a partial focal length of f (L4)=−369 mm, and thereby differs clearly from the objective according to FIG. 1. Because of the reciprocal relationship with the refractive power, the greater partial focal length of the lens element (L4) means that this lens element (L4) is assigned a lesser negative refractive power here. For the purpose of compensation, the lens element of positive refractive power (L5) is combined with a lens element of negative refractive power (L5') to form a cemented component (L5'/L5) with a positive total refractive power overall. The required negative refractive power of the lens element (L4) is therefore split up between two lens elements, thus yielding more options for reducing the imaging errors. With the values of f (L5'/L5) =68 mm and f (L6/L7)=154 mm, the partial focal lengths of the cemented components are again of the same order of magnitude as in the case of the corresponding lens elements according to FIG. 1.

Figure 2A:
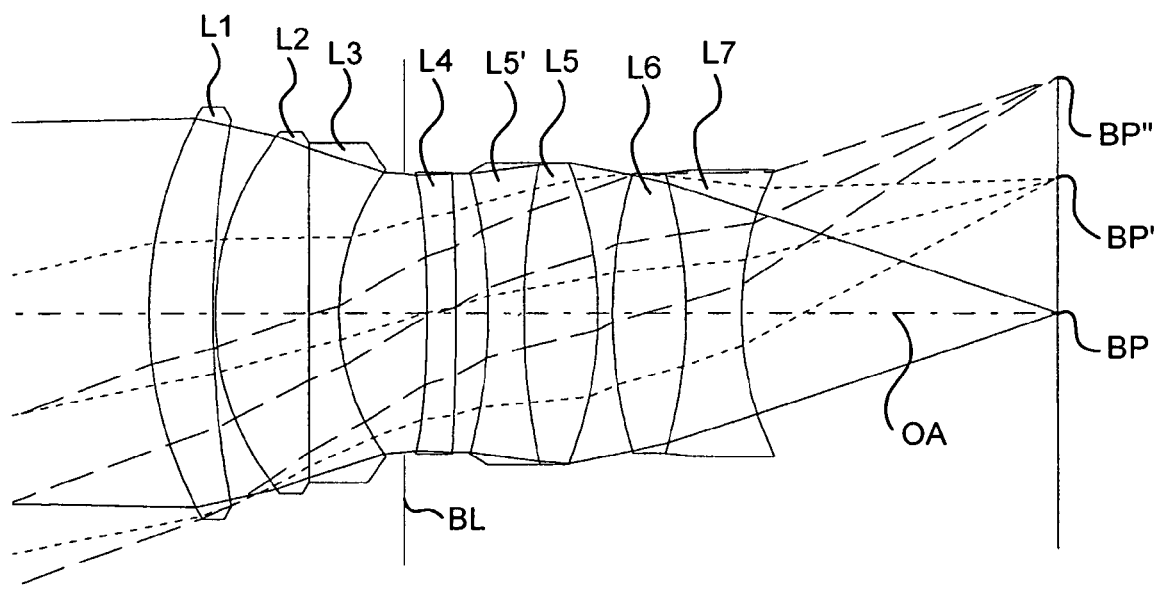
FIG. 2a shows the same lens section in the close-up focusing of 0.70 m.

The variation in the air gap for compensating imaging errors in the case of focusing on objects situated nearby is substantially less here, however, as is to be gathered from FIG. 2a for close-up focusing on objects at a distance of 0.70 m.

I claim:

1. A photographic objective of the modified double gauss type having a front group, comprising three lens elements L1, L2, L3 and having the refractive power sequence positive, positive, negative, an aperture and a rear group including lens elements L4, L5, L6 of refractive power sequence negative, positive, positive, wherein in the rear group the lens element of negative refractive power L4 is designed as a meniscus with an aspheric surface concave element of negative refractive power L7 with surfaces concave on both sides is arranged downstream of the last lens element of positive refractive power L6; wherein the two lens elements of the rear group of positive refractive L5,L6 are fabricated from a high-index glass, and the downstream lens element of negative refractive power L7 comprises glass with a low Abbe number.

2. The photographic objective as claimed in claim 1, wherein in the rear group the first lens element of positive refractive power L5 is combined with a lens element, facing the aperture, of negative refractive power L5' to form a cemented component of positive total refractive power.

3. The photographic objective as claimed in claim 2, wherein it has a focal length of 50 mm and a relative aperture of 1:1.4.

4. The photographic objective as claimed in claim 3, wherein the lens element L1 has a focal length within ±5% of 77 mm, the lens elements L2 and L3 have a combined focal length within ±5% of −97 mm, the lens element L4 has a focal length within ±5% of −369 mm, the lens elements L5 and L5' have a combined focal length within ±5% of 68 mm and wherein the lens elements L6 and L7 have a combined focal length within ±5% of 154 mm.

5. The photographic objective as claimed in claim 1, wherein the first lens element L1 of the front group is convex-concave and made from a high-index glass, and the two further lens elements L2, L3 are made from a glass with anomalous partial dispersion, and the surface of the third lens element L3 directed towards the aperture B1 is concave.

6. The photographic objective as claimed in claim 1, wherein the lens element L6 and the lens element of negative refractive power L7 combined to form L6/L7.

7. The photographic objective as claimed in claim 6, wherein two outer surfaces of the last cemented component L6/L7 are situated approximately concentrically relative to an image point lying on the optical axis of the objective.

8. The photographic objective as claimed in claim 7, wherein the entire objective can be adjusted along its optical axis for the purpose of focusing, the positioning movement of the last cemented component L6/L7 being reduced as compared with that of the remaining lens elements, such that an air gap between the two lens group L5, and L6/L7 is enlarged in the event of focusing toward the short-range field.

9. The photographic objective as claimed in claim 1, wherein the second and third lens elements L2, L3 of the front group are combined to form a cemented component L2/L3 of negative total refractive power.

10. The photographic objective as claimed in claim 1, wherein it has a focal length of 75 mm and a relative aperture of 1:2.0.

11. The photographic objective as claimed in claim 10, wherein the lens element L1 has a focal length within ±5% of 77 mm, the lens elements L2 and L3 have a combined focal length within ±5% of −94 mm, the lens element L4 has a focal length within ±5% of −76 mm, the lens element L5 has a focal length within ±5% of 65 mm and wherein the lens elements L6 and L7 have a combined focal length within ±5% of 141 mm.

12. A photographic objective of the modified double gauss type having a front group, comprising three lens elements L1, L2, L3 and having the refractive power sequence positive, positive, negative, an aperture and a rear group including lens elements L4, L5, L6 of refractive power sequence negative, positive, positive, wherein in the rear group the lens element of negative refractive power L4 is designed as a meniscus with an aspheric surface concave relative to the aperture, and a lens element of negative refractive power L7 with surfaces concave on both sides is arranged downstream of the last lens element of positive refractive power L6; wherein the first lens element L1 of the front group is convex-concave and made from a high-index glass, and the two further lens elements L2, L3 are made from a glass with anomalous partial dispersion, and the surface of the third lens element L3 directed towards the aperture B1 is concave.

* * * * *